United States Patent [19]

Gosis et al.

[11] Patent Number: 4,865,284

[45] Date of Patent: Sep. 12, 1989

[54] COLLIMATOR STORAGE DEVICE IN PARTICULAR A COLLIMATOR CART

[75] Inventors: Anatoly I. Gosis, Palatine; Margaret Fialko, Morton Grove, both of Ill.

[73] Assignee: Siemens Gammasonics, Inc., Des Plaines, Ill.

[21] Appl. No.: 175,651

[22] Filed: Mar. 22, 1988

Related U.S. Application Data

[63] Continuation of Ser. No. 924,099, Oct. 28, 1986, abandoned, which is a continuation of Ser. No. 589,196, Mar. 13, 1984, abandoned.

[51] Int. Cl.4 .......... F16M 11/04

[52] U.S. Cl. .......... 248/187; 211/41

[58] Field of Search .......... 248/187, 129, 345.1, 248/128, 121; 211/40, 41, 133, 126; 280/79.1 A, 79.1 R

[56] References Cited

U.S. PATENT DOCUMENTS

| | | | |
|---|---|---|---|
| 2,531,543 | 11/1950 | Sutphen | 211/41 X |
| 2,746,882 | 5/1956 | Hamal | 211/41 X |
| 2,851,235 | 9/1958 | Henig | 280/79.1 A X |
| 3,428,187 | 2/1969 | Baggott | 211/126 X |
| 3,499,540 | 3/1970 | Huncovsky | 211/126 X |
| 3,722,700 | 3/1973 | Cummings | 248/345.1 X |

*Primary Examiner*—Robert W. Gibson, Jr.
*Assistant Examiner*—Karen J. Chotkowski
*Attorney, Agent, or Firm*—Mark H. Jay

[57] ABSTRACT

A collimator storage device for a collimator having a certain diameter. The device comprises a support, a first collimator storage member having a first slot for inserting the collimator, and a second collimator storage member having a second slot for inserting the collimator. The first and second collimator storage members are mounted at the support in a distance from each other which is smaller than the diameter of a collimator having smallest size such that the first and second slots combine for bearing a smallest size collimator or a collimator having larger diameter therebetween.

10 Claims, 5 Drawing Sheets

COLLIMATOR STORAGE DEVICE IN PARTICULAR A COLLIMATOR CART

CROSS-REFERENCE TO RELATED APPLICATION

This is a continuation of Ser. No. 589196 filed Mar. 13, 1984, abandoned and Ser. No. 924,099 filed Oct. 28, 1986.

BACKGROUND OF THE INVENTION

1. Field of the Invention

The present invention relates to a collimator storage device. In particular, it relates to a collimator cart.

2. Description of the Prior Art

Collimators are used for radiation diagnosis purposes in connection with radiation detectors, such as for gamma, or x-ray radiation. The weights of different collimators may vary between 10 to 100 kilos. In particular for gamma cameras, heavy collimators and light collimators together have to be stored as close as possible to the camera. This makes it easier to change collimators during investigation.

A collimator storage device having the shape of a collimator cart, is for example illustrated on page 5 of the brochure "ZLC Gamma Camera Series" issued by Siemens Gammasonics, Inc., 2000 Nuclear Drive, Des Plaines, Illinois under No. MG/5710-007-121B 3M 2/82. This device provides storage of up to two medium energy or pinhole collimators on a lazy susan rack on top of the cart. Another four low energy collimators can be stored in four parallel horizontal compartments. For picking up or restoring of a low energy collimator the medical personnel is forced to bend down, which unnecessarily stresses the body.

It is easier to pick up a low energy collimator from or to restore it in a vertical position. The personnel's bodies are not so much stressed since all low energy collimators are vertically stapled in the same height. A device for vertically stapling low energy collimators in a pivoting console is for example depicted on page 3 of the brochure "Pho/Gamma ® LEM ® Mobile Scintillation Camera" issued by Siemens Gammasonics under No. RR88010M507. This prior art collimator storing device comprises container-like vertical compartments inside the pivoting console, which however is not optimum with respect to collimators having for example different sizes, i.e. different diameters.

SUMMARY OF THE INVENTION

Objects

It is an object of this invention to provide an improved collimator storage device which allows an easy, compact collimator storage independent of the collimator's size and which is comfortable to operate by the medical personnel.

It is another object of this invention to provide such an improved collimator storage device, which has in particular the shape of a collimator cart.

Summary

According to this invention a collimator storage device is provided, which comprises (a) a support;

(b) a first collimator storage member having a first slot for inserting the collimator; and (c) a second collimator storage member having a second slot for inserting the collimator;

wherein the first and second collimator storage members are mounted at the support in a distance from each other which is smaller than the diameter of a collimator having smallest size such that the first and second slots combine for bearing a smallest size collimator or a collimator having larger diameter therebetween.

Contrary to the prior art, collimators of any different size can be stored and easily be picked up by the medical personnel without too many efforts according to this invention.

In a preferred embodiment the collimator storage device further comprises a third collimator storage means which is mounted at the support perpendicular with respect to the first and second collimator storage members for storing a collimator in horizontal position. In particular, the first and second collimator storage members are designated for storing lighter collimators and the third collimator storage means are designated for storing heavier collimators.

The foregoing and other objects, features and advantages of the invention will be apparent from the following more particular description of preferred embodiments of the invention, as illustrated in the accompanying drawings.

DESCRIPTION OF THE PREFERRED EMBODIMENTS

Figure 1:
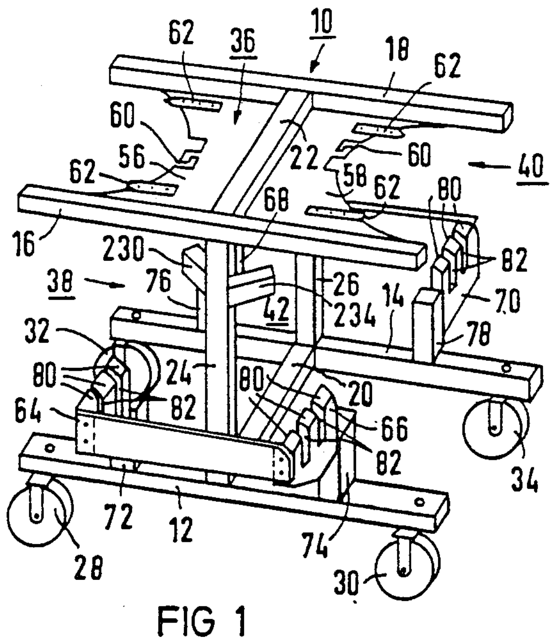
FIG. 1 is an overall perspective view showing a first embodiment of the invention in the shape of a collimator cart.
Figure 2:
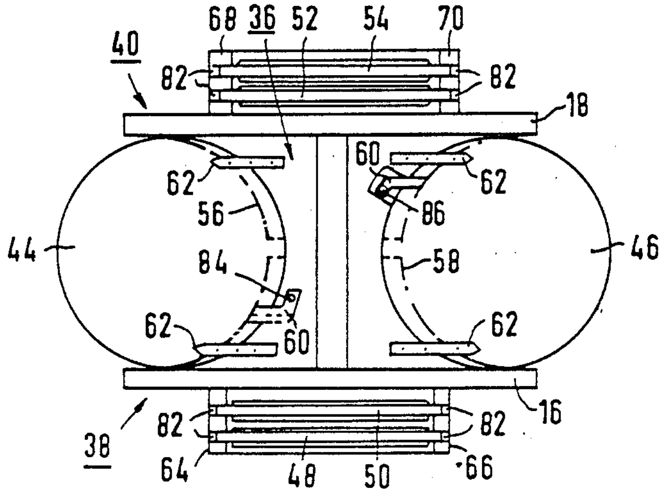
FIG. 2 is a top view of the embodiment of FIG. 1 in the case all collimators are inserted.

The collimator cart according to FIGS. 1 and 2 has a support frame 10 which comprises four horizontal longitudinal frame bars 12, 14, 16 and 18, two horizontal cross arms 20 and 22 and two vertical frame bars 24 and 26 which are all connected with each other as illustrated in FIG. 1. At each horizontal longitudinal frame bar 12 and 14 there is mounted a pair of cart wheels 28, 30 and 32, 34, respectively.

The horizontal longitudinal frame bars 16 and 18 and the horizontal cross arm 22 confine an upper horizontal surface 36 of the support frame 10. Correspondingly, the horizontal longitudinal frame bars 12 and 16 together with the vertical frame bar 24 outline a first vertical lateral surface 38 and the horizontal longitudinal frame bars 14 and 18 together with the vertical frame bar 26 limit a second vertical lateral surface 40 of the support frame 10. The upper horizontal surface 36 and the first and second vertical lateral surfaces 38 and 40 encompass an inner frame room 42.

According to FIG. 2, a first heavier collimator 44 (e.g. a medium energy collimator) and a second heavier collimator 46 (e.g. pinhole collimator) can be deposited horizontally in the upper horizontal surface 36 of the support frame 10 of the collimator cart. Another four collimators 48, 50, 52 and 54 which are lighter (e.g. low energy collimators), can be stored outside the inner frame room 42 in vertical planes which are parallel to the first and second vertical lateral surfaces 38 and 40 of the support frame 10 of the collimator cart. The collimators 48, 50, 52 and 54 may have different sizes, e.g. different diameters.

For placing the first heavier collimator 44 in the upper horizontal surface 36 a first horizontal collimator supporting plate or tray 56 is mounted between the horizontal longitudinal frame bars 16 and 18 on the left side of the horizontal cross arm 22. For depositing the second heavier collimator 46 in the upper horizontal surface 36 a second horizontal collimator supporting plate or tray 58 is attached between the horizontal longitudinal frame bars 16 and 18 on the right side of the horizontal cross arm 22. The first and second horizontal collimator supporting plates or trays 56 and 58, which are for example fabricated of sheet steel being curved as indicated in FIGS. 1 and 2, each comprise a hook-shaped slot 60, respectively. Slot 60 serves for locking the first and second heavier collimators 44 and 46 in horizontal positions on the first and second horizontal collimator supporting plates or trays 56 and 58 on each side of the horizontal cross arm 22 of the support frame 10 of the collimator cart. A pair of locking springs 62 on each tray 56, 58 are designated for locking the collimator against rotation.

For the purpose of vertically storing the other four (lighter) collimators 48 to 54 a first, second, third and fourth slot members 64, 66, 68 and 70 are mounted on the horizontal longitudinal frame bars 12 and 14 by means of vertical plugs 72, 74, 76 and 78, such that the slot members are aligned perpendicularly away from the first and second vertical lateral surfaces 38 and 40 of the support frame 10 of the collimator cart. Each slot member 64, 66, 68 and 70 being shaped like a comb has three comb teeth 80 and two comb gaps 82 therebetween.

The comb-shaped slot members 64 to 70 are arranged in pairs at the support frame 10. The first pair of slot members 64 and 66 are mounted at the first vertical lateral surface 38. The second pair of slot members 68 and 70 are mounted at the second vertical lateral surface 40. In each pair of slot members 64, 66 or 68, 70 the comb teeth 80 of the one slot member and the comb teeth 80 of the other slot member lie on common horizontal lines. Correspondingly, also the comb gaps 82 of the one slot member and comb gaps 82 of the other slot member lie on common horizontal lines. Also in each pair of slot members the latter ones are arranged at plugs 72, 74 or 76, 78 at the first or second vertical lateral surfaces 38, 40 in a distance from each other which is smaller than the diameter of a smallest size collimator (e.g. 18–20 inches). Under these circumstances, a smallest size collimator, or a collimator having a larger diameter, is borne by the slot members of each slot member pair, after having been inserted between two corresponding comb gaps 82 which lie on a horizontal line. Finally, the comb gaps 82 are insignificantly broader than the collimator thickness. Under these circumstances, a collimator, after having being inserted, is prevented from lateral tilting and thus is kept in vertical position within two corresponding comb gaps 80.

As already mentioned above, FIG. 2 depicts a top view of the collimator cart according to FIG. 1 with inserted collimators. In FIG. 2 the first horizontally positioned heavier collimator 44 comprises a first locking pin 84 for locking the collimator 44 in slot 60 of the first horizontal collimator supporting plate or tray 56. Correspondingly, the second horizontally placed heavier collimator 46 comprises a second locking pin 86 for locking the second collimator 46 in slot 60 of the second horizontal collimator supporting plate or tray 58. From the vertically stored four lighter collimators 48, 50, 52 and 54, two, namely collimators 48 and 50 are arranged parallel to the first vertical lateral surface 38 and the other two, namely collimators 52 and 54 are placed parallel to the second vertical lateral surface 40 of the support frame 10 of the collimator cart.

Under these circumstances, at least two heavier and four lighter collimators can be stored in a compact manner on a collimator cart in vertical and horizontal planes. For changing a heavier collimator, the radiation detector 88 of for example a scintillation gamma camera, can be brought into a position beneath a horizontal collimator supporting plate or tray 56 or 58 where a heavier collimator is stored. This is for example illustrated in FIGS. 5 and 6. The heavier collimator can then be unlocked by twisting and the unlocked collimator can than be mounted on the radiation detector. A lighter collimator 48 to 54 can easily be changed by picking up the collimator from the vertical storage position by hand and mounting the picked up collimator at the radiation detector. Under these circumstances, both heavier and lighter collimators can easily be picked up by the medical personnel without any effort.

The same can be stated with respect to the second embodiment of the invention. The collimator cart as illustrated in FIGS. 3 and 4 again comprises a support frame 100, which, however is made up of only two horizontal longitudinal frame bars 102 and 104 and four vertical frame bars 106, 108, 110 and 112 which are connected with each other by means of four horizontal cross arms 114, 116, 118 and 120 as illustrated in FIG. 3. Again, at each horizontal longitudinal frame bar 102 and 104 there is mounted a pair of cart wheels 122, 124, 126 and 128, respectively.

Figure 3:
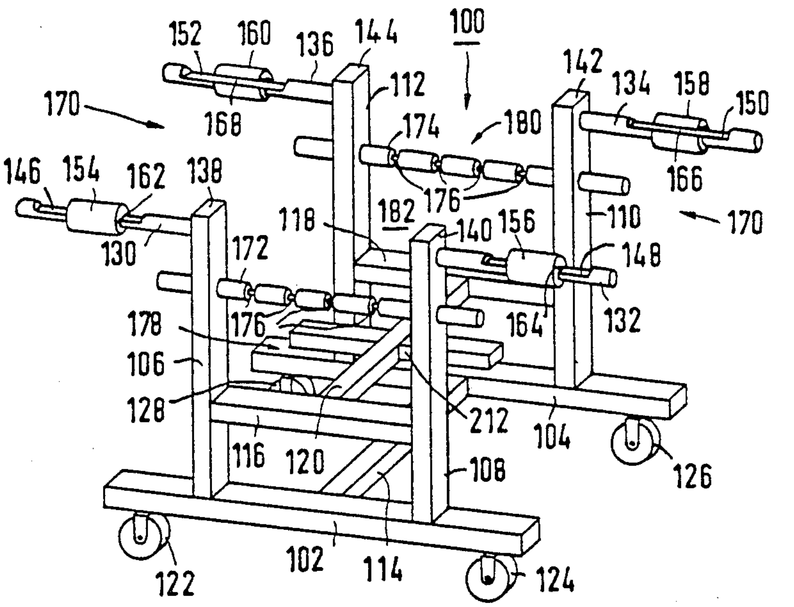
FIG. 3 is an overall perspective view showing a second embodiment of the invention in the shape of a collimator cart.
Figure 4:
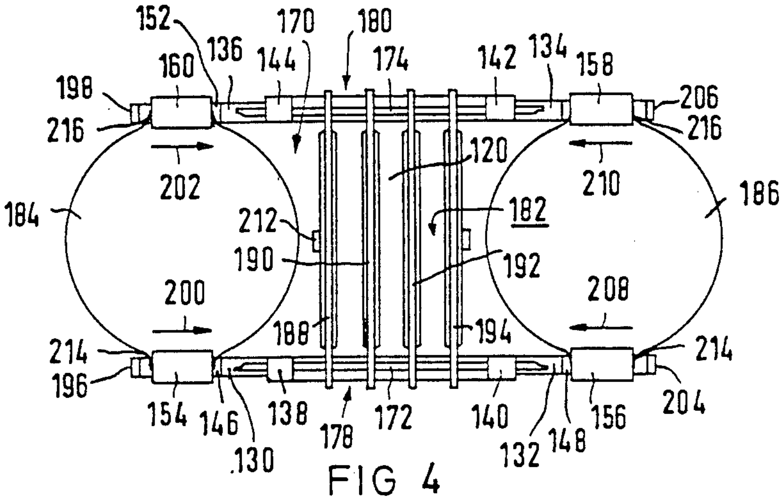
FIG. 4 is a top view of the embodiment of FIG. 3 in the case all collimators are inserted.

Furthermore, the support frame 100 of the collimator cart according to FIGS. 3 and 4 incorporates four horizontal collimator support arms 130, 132, 134 and 136 which are mounted at the vertical frame bars 106 to 112 close to the top ends 138, 140, 142 and 144 of the vertical frame bars 106 to 112. Each horizontal collimator support arm 130 to 136 embodies a surface clearance 146, 148, 150 and 152 and a spring-loaded bushing 154, 156, 158 and 160. Each spring-loaded bushing 156 to 160 has a longitudinal slot 162, 164, 166 and 168 and is mounted slidably along the corresponding horizontal collimator support arms 130 to 136. The horizontal collimator support arm 130 to 136 confine an upper horizontal surface 170 of the support frame 100.

The support frame 100 of the collimator cart according to FIGS. 3 and 4 finally comprises a first collimator guide bar 172 and a second collimator guide bar 174.

The first collimator guide bar 172 is mounted between the vertical frame bars 106 and 108 as illustrated in FIGS. 3 and 4. Correspondingly, the second collimator guide bar 174 is mounted between the vertical frame bars 110 and 112, such that it is arranged parallel to the first collimator guide bar 172. Each of the collimator guide bars 172, 174 comprises a total of four circular or ring-shaped grooves 176. In each collimator guide bar 172, 174, always one circular groove at one collimator guide bar and a corresponding circular groove at the other collimator guide bar lie on a straight horizontal line.

The vertical frame bars 106 and 108, the horizontal cross arm 116 and the first collimator guide bar 172 outline a first vertical lateral surface 178 of the support frame 100 of the collimator cart if FIGS. 3 and 4. Correspondingly, the vertical frame bars 110 and 112, the horizontal cross arm 118 and the second collimator guide bar 174 limit a second vertical lateral surface 180 of the support frame 100.

The upper horizontal surface 170 and the first and second vertical lateral surfaces 178 and 180 thus encompass an inner support frame cavity 182.

According to FIG. 4, a first heavier collimator 184 (e.g. a medium energy collimator) and a second heavier collimator 186 (e.g. a pinhole collimator) can be deposited horizontally in the upper horizontal surface 170 of the support frame 100 of the collimator cart. Another four collimators 188, 190, 192 and 194, which are lighter (e.g. low energy collimators), can be stored inside the inner support frame cavity 182 in vertical planes which are perpendicular to the first and second vertical lateral surfaces 178 and 180 of the support frame 100 of the collimator cart. Again, the distance between the first and second collimator guide bars 172, 174 are smaller than a collimator having smallest size such that two corresponding circular grooves 176 combine for bearing a smallest size collimator or a collimator having larger diameter therebetween.

For placing a heavier collimator 184 or 186 in the upper horizontal surface 170, the heavy collimator is deposited between the end portions of two horizontal collimators support arms which are opposite to each other. Then the collimator is slowly shifted along the two opposite horizontal collimator support arms against the force of the spring of the bushings which belong to these horizontal collimator support arms. The collimator shifting displaces the bushings from a first position above the surface clearances of the corresponding horizontal collimator support arms (as illustrated in FIGS. 3 and 4) to a second position behind these surface clearances. At the moment, the collimator slips into the surface clearances each bushing is driven back by its spring force into its first position above its corresponding surface clearance. As a result the collimator is locked in both surface clearances by means of the bushings via the bushing slots.

In FIG. 4, for example, the first heavier collimator 184 had been first deposited between the opposite ends 196 and 198 of the horizontal collimator support arms 130 and 136. Then collimator 184 had been shifted along the horizontal collimator support arms 130 and 136 in the direction of the arrows 200 and 202 against the spring forces of the spring-loaded bushings 154 and 160. After the collimator 184 reached the surface clearances 146 and 152 of the horizontal collimator support arms 130 and 136 it became locked by the bushings 154 and 160 via the bushing slots 162 and 168 in the afore described manner. The same procedure happened with respect to the second heavier collimator 186 which had been deposited on the ends 204 and 206 of the horizontal collimator support arms 132 and 134 and then had been shifted in the direction of arrows 208 and 210 to become locked in the surface clearances 148 and 150 by means of bushings 156 and 158.

According to FIG. 3 a foot support 212 may be used as additional support for the collimators 188, 190, 192 and 194 inserted into the grooves between the first and the second collimator guide bars 172 and 174. Each circular groove 176 is also merely insignificantly broader than the collimator thickness. Due to this a collimator 188, 190, 192 or 194, after having been inserted, is prevented from lateral tilting and thus is kept in vertical position inside the inner frame room 182 between the first and second collimator guide bars 172, 174.

Under these circumstances, again at least two heavier and four ligher collimators can be stored in a compact manner on a collimator cart in vertical and horizontal planes. As already described with respect to the first embodiment of the invention and as also illustrated in FIG. 7, again for changing a heavier collimator the radiation detector 88′ of for example a scintillation gamma camera can be brought into a position beneath a pair of horizontal collimator support arms where a heavier collimator is stored. The heavier collimator can then be unlocked by shifting the spring-loaded bushings into the second position. The unlocked collimator can then be picked up and mounted at the gamma camera head. In the situation when a heavier collimator, which is mounted on a camera head, has to be deposited at the collimator cart, again the camera head together with the mounted heavier collimator is brought into the position beneath the ends of two opposite horizontal collimator support arms. By shifting the radiation detector together with the collimator, the collimator will shift the bushings from their first position to their second position. As soon as the collimator snaps into the surface clearances the bushings return into the first position and the collimator becomes locked. After demounting the collimator the radiation detector can again be moved away from the position beneath the collimator. The collimator is now stored on the collimator cart.

In the case the collimator comprises a first and a second lifting handholds which are arranged at the collimator at diametrical opposite sides, said lifting handholds may be designated for being inserted into the surface clearances of a pair of opposite collimator support arms. This possibility is for example indicated in FIG. 4, where the first and second lifting handholds of the collimators 184 and 186 are generally designated by 214 and 216.

Figure 5:
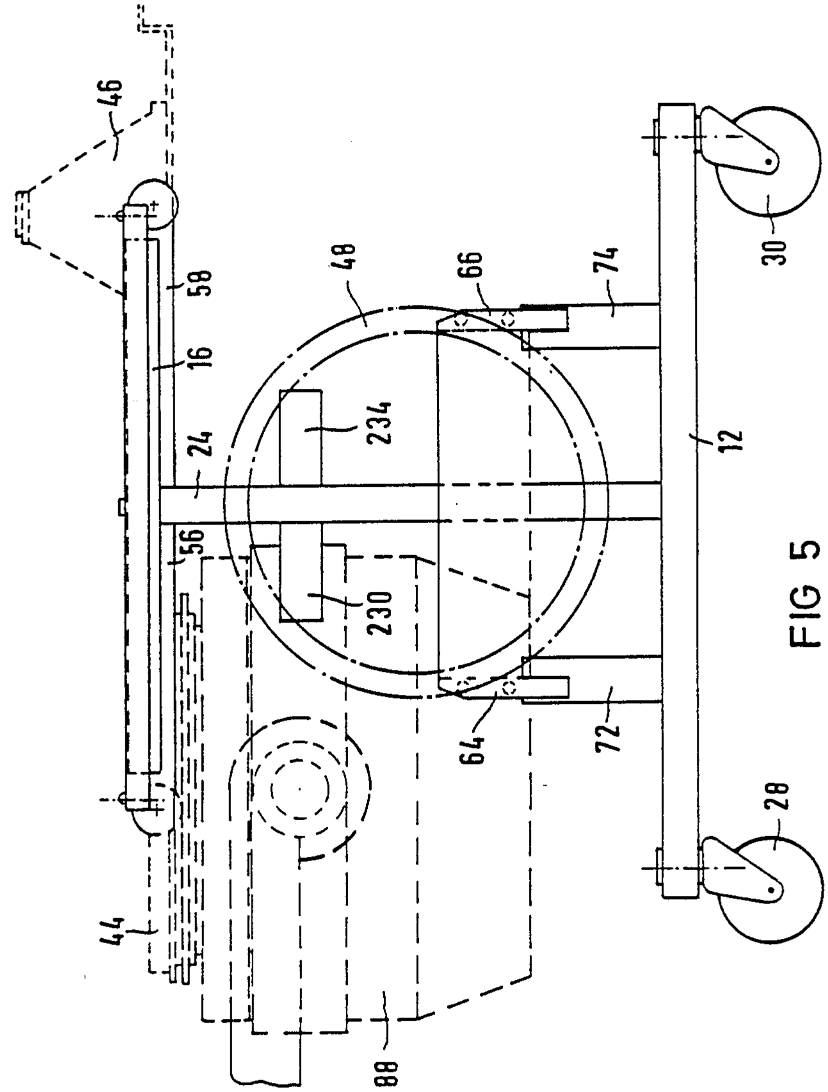
FIG. 5 is an enlarged side elevation of a collimator cart according to FIGS. 1 and 2 with a radiation detector of a scintillation gamma camera in a position for picking up or restoring a medium energy collimator.
Figure 6:
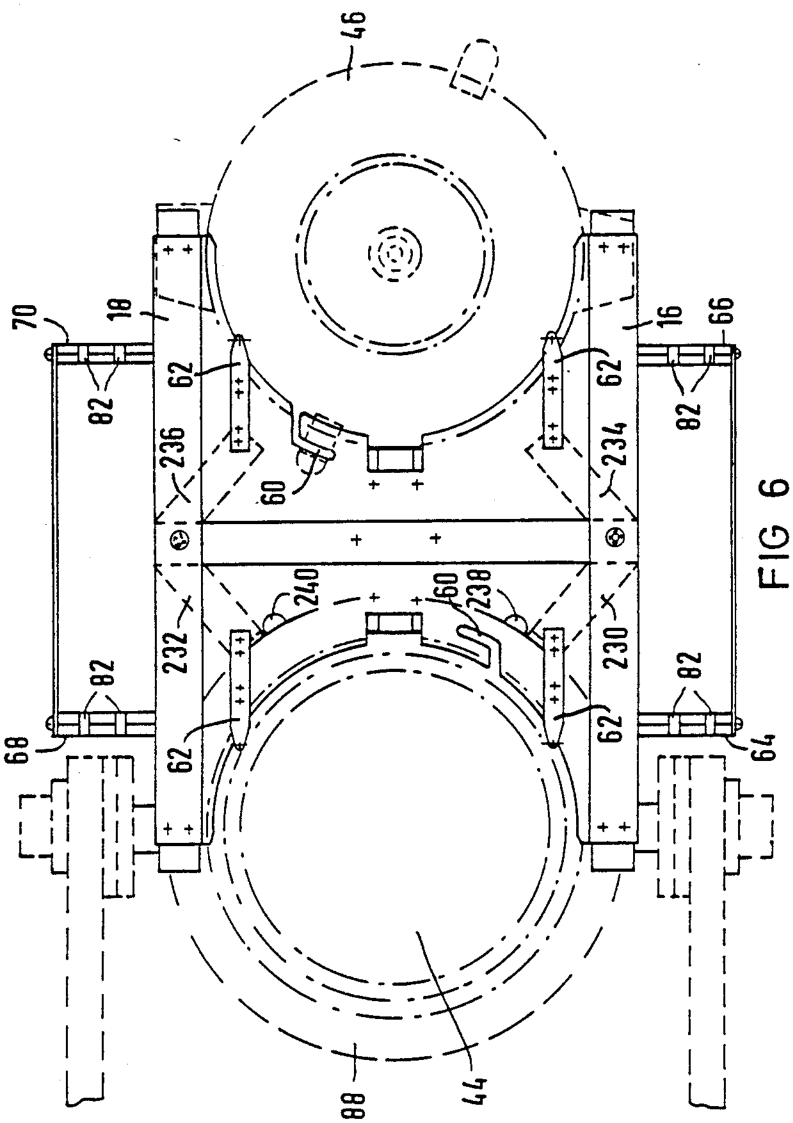
FIG. 6 is a top view of the collimator cart of FIG. 5.
Figure 8:
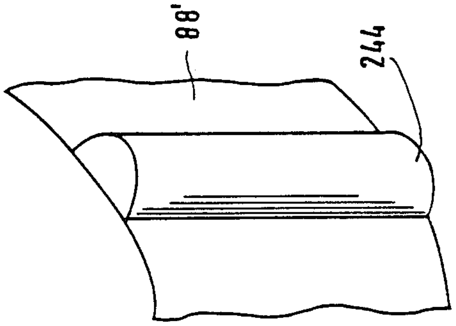
FIG. 8 is an enlargement of a portion of the radiation detector shown in FIG. 7.

As is further indicated in FIGS. 1, 5 and 6, the support frame 10 of the collimator cart may also comprise a first pair of bumpers 230, 232 on the left side of the cart underneath the collimator tray 56 and a second pair of bumpers 234, 236 on the right side of the cart underneath the collimator tray 58. Each pair of bumpers 230, 232 or 234, 236 are designated for restricting the relative linear movement between the radiation detector 88 and the collimator cart, when the radiation detector 88 penetrates into the space underneath a collimator tray 56 or 58. A first and second stops 238, 240, which are mounted at the circumference of the radiation detector 88, serves for restricting the relative rotational movement between the radiation detector and the first and second pair of bumpers 230, 232 or 234, 236. Under these circumstances, the radiation detector is always in a fixed central position with respect to the collimator cart underneath a collimator tray 56 or 58.

Figure 7:
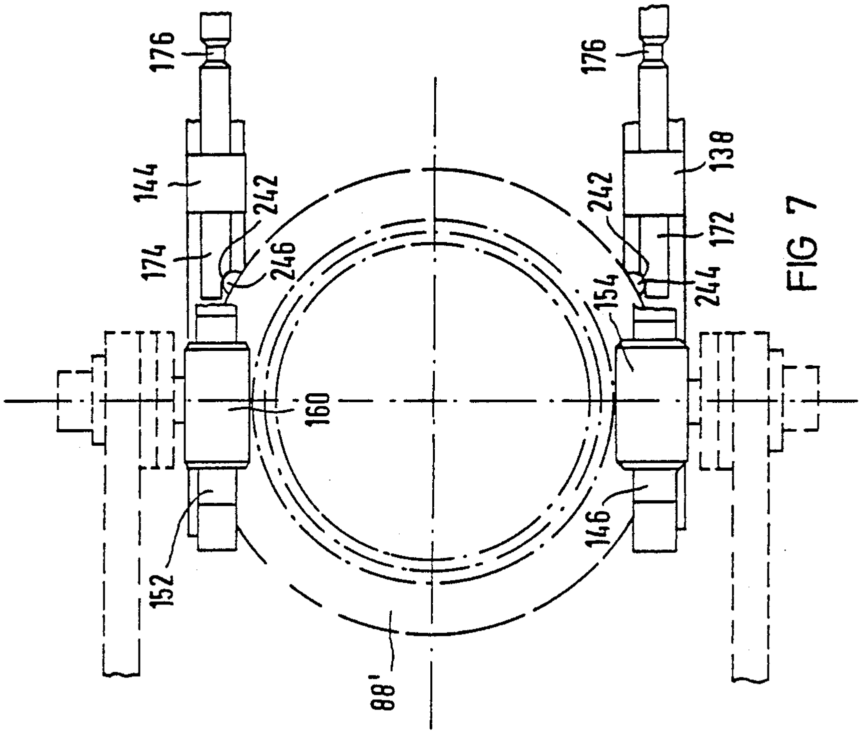
FIG. 7 is an enlarged portion of a top view of a collimator cart according to FIGS. 3 and 4 with radiation detector of a scintillation gamma camera in a position for picking up or restoring a medium energy collimator.

The same situation can be stated with respect to the collimator cart according to FIG. 3. As indicated in the enlargement of FIG. 7 each end of the first and second collimator guide bars 172 and 174 comprises a recess 242. The recesses 242 of two opposite bar ends face each other. Each recess 242 of a pair of recesses facing each other is designated for receiving a stop of a pair of stops 244, 246 which are mounted at the circumference of the radiation detector 88'. Therefore, in case of collimator cart 100 of FIG. 3 the recesses 242 of the end positions of the first and second collimator guide bars 172, 174 serve as bumpers for the radiation detector which always keeps the radiation detector in a fixed central position underneath horizontal collimator support arms 132, 134 or 136, 138.

Having thus described the invention with particular reference to the preferred forms thereof, it will be obvious to those skilled in the art to which the invention pertains, after understanding the invention, that various changes and modifications may be made therein without departing from the spirit and scope of the invention as defined by the claims appended hereto.

What is claimed is:

1. A collimator storage device, comprising:

(a) a support comprising a support frame having first, second, third and fourth lateral frame surfaces, a top surface and a bottom surface, all said surfaces defining a support frame cavity;

(b) a first collimator storage member mounted at the support frame outside the support frame cavity and shaped like a comb having a row of comb teeth and comb gaps between adjacent comb teeth, said comb gaps forming a number of first vertical slots corresponding to the number of collimators;

(c) a second collimator storage member mounted at the support frame outside the support frame cavity and shaped like a comb having a row of comb teeth and comb gaps between adjacent comb teeth, said comb gaps forming a number of second vertical slots corresponding to the number of collimators; and (d) a number of collimators each having at least a predetermined minimum diameter;

wherein always one first vertical slot of the number of first vertical slots together with one second vertical slot of the number of second vertical slots forms a pair of slots, wherein said first and second storage members carry at least one collimator out of said number of collimators, said collimator being received in a vertical position by the first and second vertical slots of one of said pair of slots, said first and second vertical slots being separated by a distance which is less than the predetermined minimum diameter of the collimator received by them.

2. The device according to claim 1, for a first and a second number of collimators, comprising a first pair of first and second collimator storage members having each a number of slots corresponding to the first number of collimators, and a second pair of first and second collimator storage members having each a number of slots corresponding to the second number of collimators.

3. The device according to claim 1, further comprising a third collimator storage means which is mounted at the support perpendicular with respect to the first and second collimator storage members for storing a collimator in horizontal position.

4. The device according to claim 1, wherein the first and second collimator storage members lie on a common horizontal line.

5. The device according to claim 3, comprising collimators having heavier weights and collimators having lighter weights, wherein the first and second collimator storage members are designated for storing the lighter collimators and the third collimator storage means is designated for storing the heavier collimators.

6. The device according to claim 3, wherein the third collimator storage means comprises a first and second storage tray for storing a first and second collimators in horizontal positions.

7. The device according to claim 3, further comprising a first and second bumpers mounted at the support underneath the third collimator storage means for restricting the relative linear movement between a detector head deposited underneath the third collimator storage means and the support.

8. The device according to claim 2, wherein the first pair of first and second collimator storage members is mounted perpendicularly with respect to the first lateral frame surface and the second pair of first and second collimator storage members is mounted perpendicularly with respect to the second lateral frame surface.

9. A collimator storage device comprising:

(a) a support comprising a support frame having first, second, third and fourth lateral frame surfaces, a top surface and a bottom surface, all said surfaces defining a support frame cavity;

(b) a first collimator storage member mounted at the support frame outside the support frame cavity and having at least one first vertical slot for inserting a collimator;

(c) a second collimator storage member mounted at the support frame outside the support frame cavity and having at least one second vertical slot for inserting a collimator; and (d) at least one collimator having at least a predetermined minimum diameter;

wherein the first and second vertical slots are separated by a distance which is less than the predetermined minimum diameter and the collimator is received in the first and second vertical slots and carried by the first and second collimator storage members in a vertical position.

10. The device according to claim 9, for a number of collimators each having at least a predetermined minimum diameter, wherein the first collimator storage member has a number of first vertical slots and the second collimator storage member has a number of second vertical slots, wherein always one first vertical slot of the number of the first vertical slots together with a second vertical slot of the number of second vertical slots forms a pair of slots, the first and second vertical slots of each pair of slots being separated by a distance which is less than one of the predetermined minimum diameters, and wherein the first and second collimator storage means carry at least one collimator out of the number of collimators, said collimator being received in a vertical position by the first and second vertical slots of one of the pairs of slots, said first and second vertical slots being separated by a distance which is less than the predetermined minimum diameter of the collimator received by them.

* * * * *